W. E. PEASE AND N. H. SULOFF.
RETAINING WALL STRUCTURE.
APPLICATION FILED JUNE 12, 1919.
1,340,670.
Patented May 18, 1920.
5 SHEETS—SHEET 1.
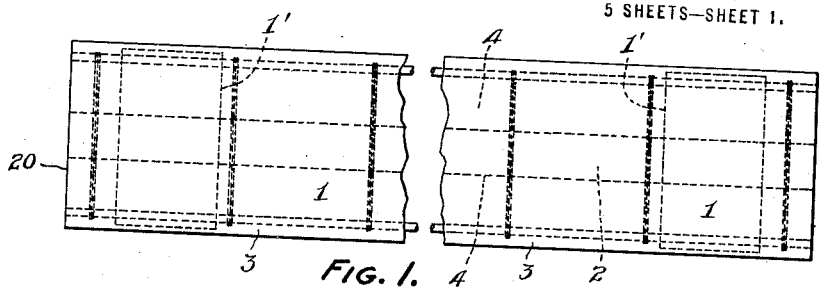
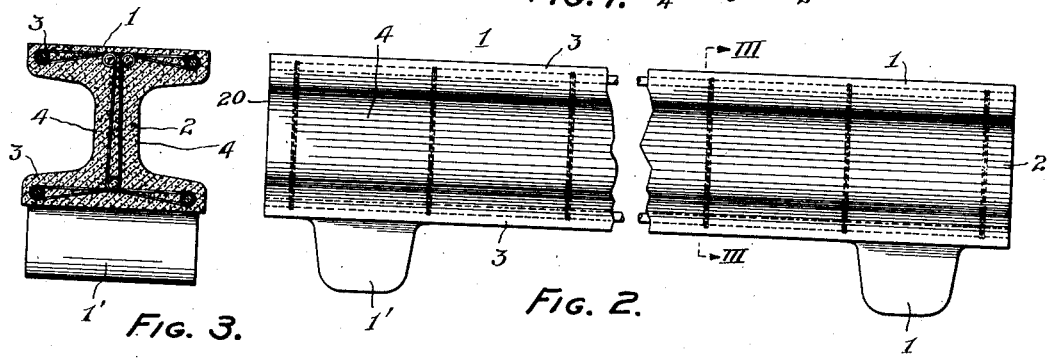
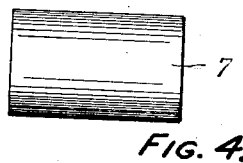
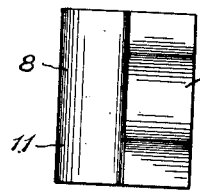
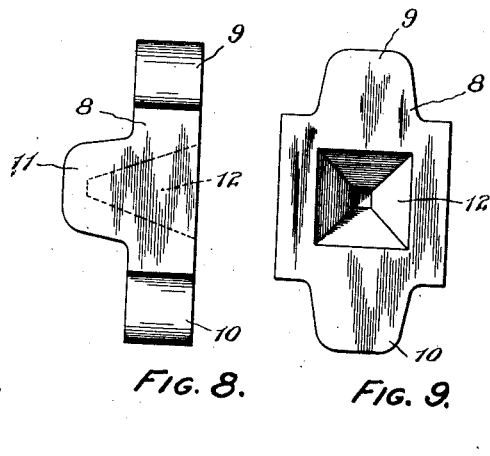
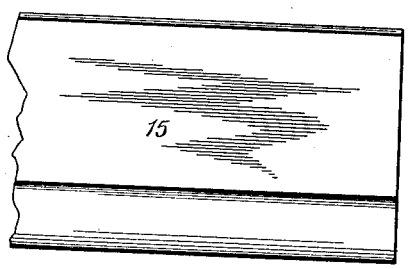
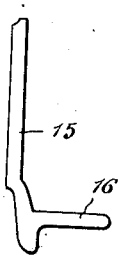
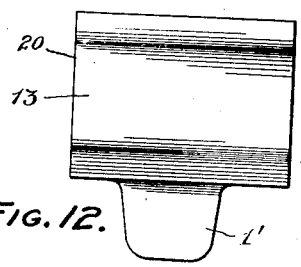
INVENTORS:
WILLIAM E. PEASE
AND
NOAH H. SULOFF
BY Frease, Merkel and Saywell
ATTORNEYS

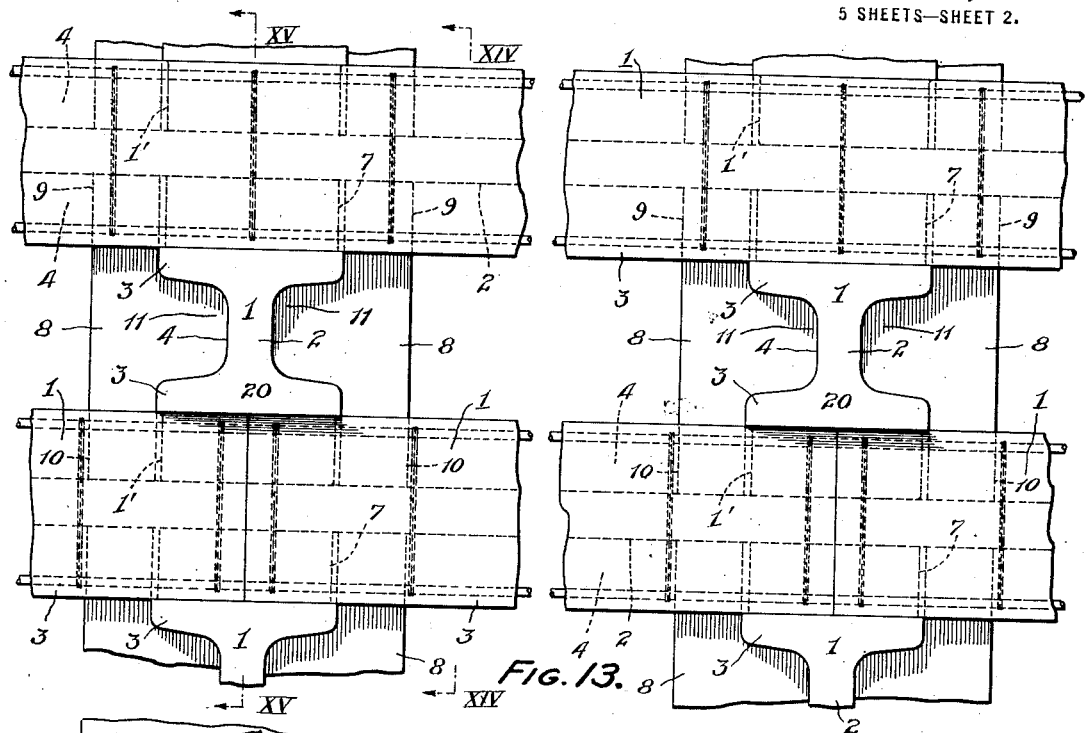
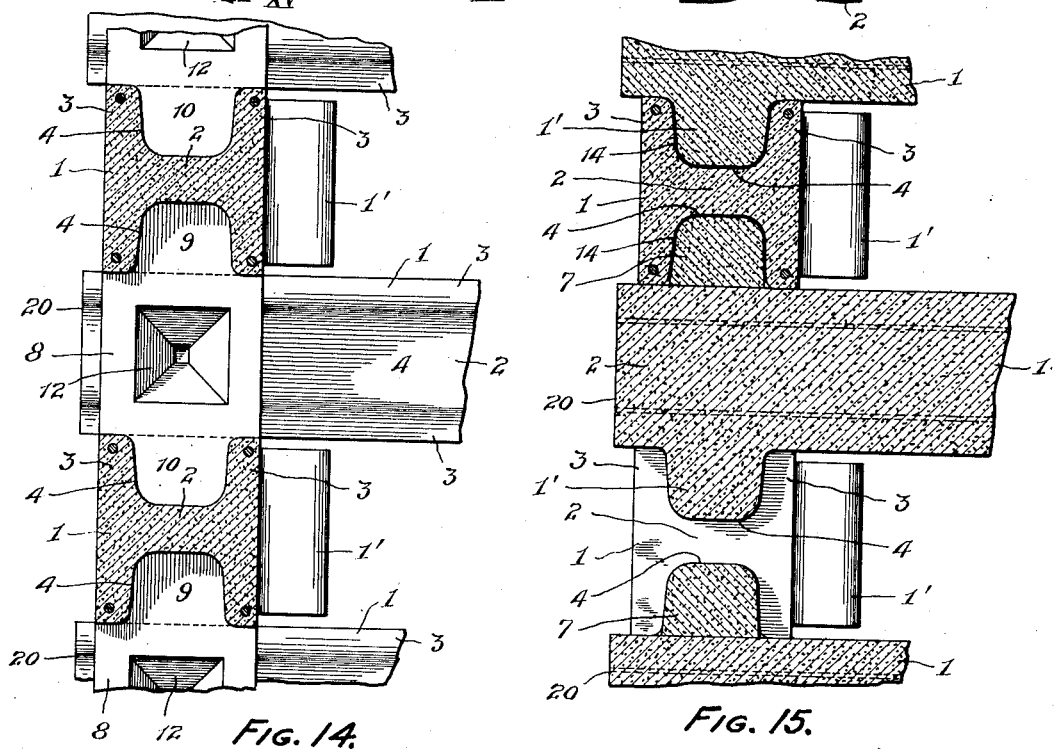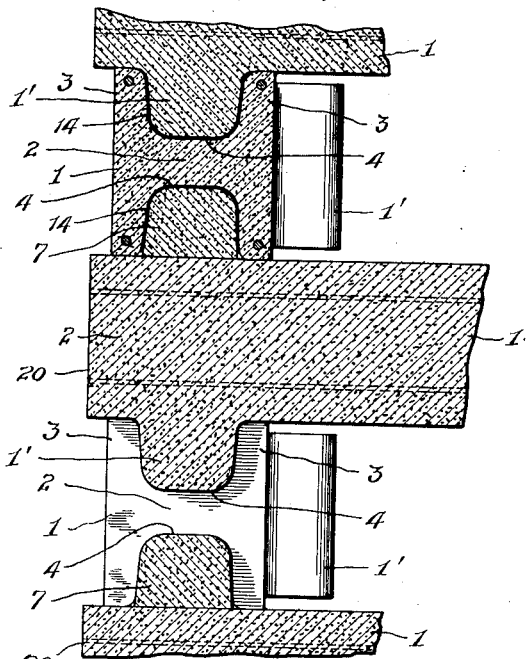
FIG. 13.
FIG. 14.
FIG. 15.

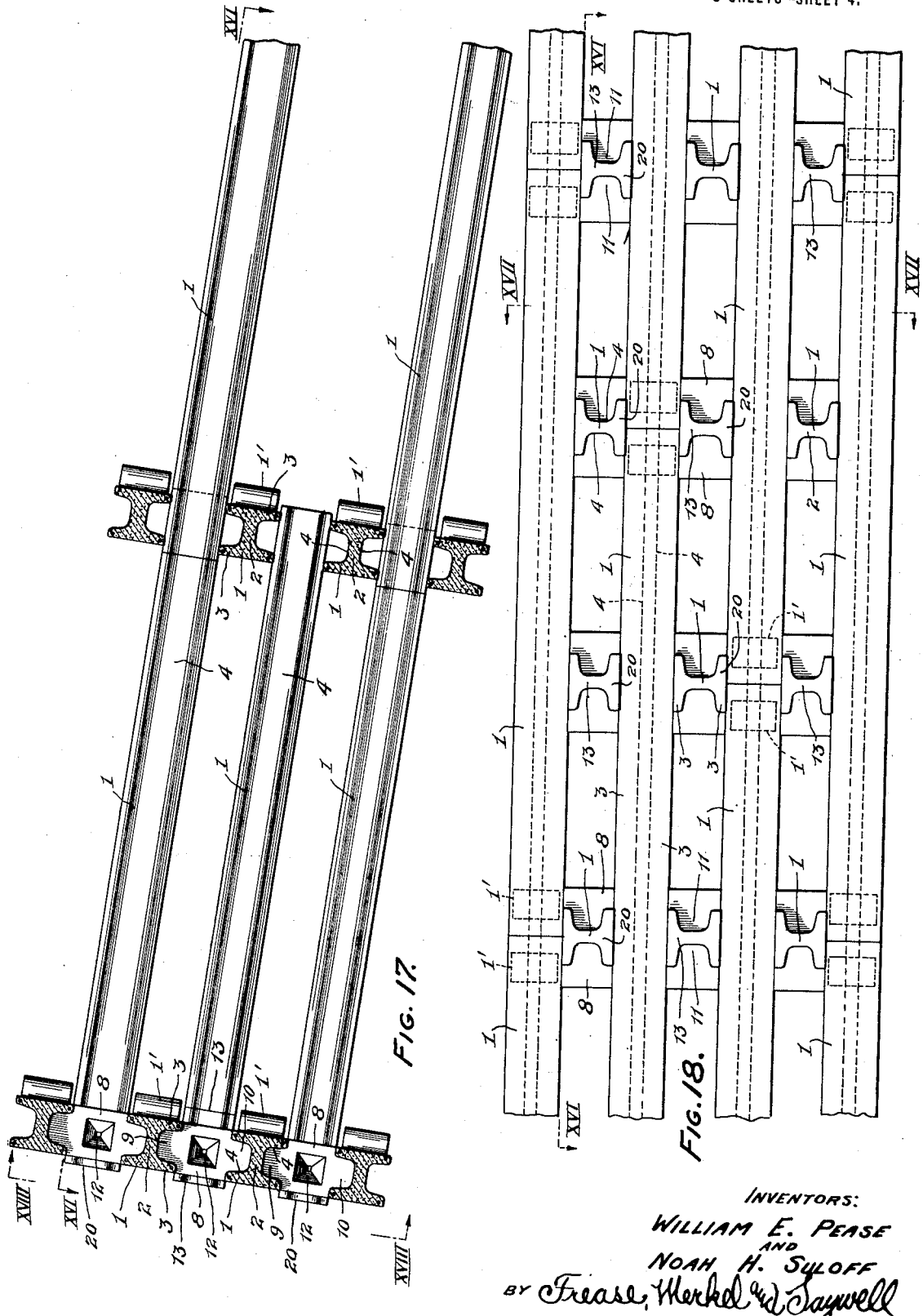

W. E. PEASE AND N. H. SULOFF.
RETAINING WALL STRUCTURE.
APPLICATION FILED JUNE 12, 1919.

1,340,670. Patented May 18, 1920.
5 SHEETS—SHEET 5.

INVENTORS:
WILLIAM E. PEASE
AND
NOAH H. SULOFF

BY Frease, Merkel and Saywell
ATTORNEYS

UNITED STATES PATENT OFFICE.

WILLIAM E. PEASE AND NOAH H. SULOFF, OF CLEVELAND, OHIO, ASSIGNORS OF ONE-THIRD TO WILLIAM H. EVERS.

RETAINING-WALL STRUCTURE.

1,340,670.  Specification of Letters Patent.  Patented May 18, 1920.

Application filed June 12, 1919. Serial No. 303,552.

*To all whom it may concern:*

Be it known that we, WILLIAM E. PEASE and NOAH H. SULOFF, citizens of the United States, residents of Cleveland, county of Cuyahoga, and State of Ohio, have invented new and useful Improvements in Retaining-Wall Structures, of which the following is a specification, the principle of the invention being herein explained and the best mode in which we have contemplated applying that principle, so as to distinguish it from other inventions.

Our invention relates to retaining wall structures and particularly to precast concrete cribbing. The invention is designed to provide for the assembling of a structure of this nature which shall be economical, easily set up and render permanent and satisfactory service. Particularly, our invention provides for the assembling of precast shapes with flexible joints by the use of a small number of different interlocking shapes or parts. And, on account of the flexibility and lightness attaching to the invention, it will permit the erection of retaining wall structures on fills and unfavorable foundations where settlement is to be expected and cannot be cared for by a rigid structure without danger of rupture or failure, and further provides that the structure can be torn down and moved or salvaged with practically no loss of material and economical labor cost.

The annexed drawings and the following description set forth in detail certain means embodying the invention, the disclosed means, however, constituting but one of the various mechanical forms in which the principle of the invention may be applied.

In said annexed drawings:—

Figures 1 and 2 represent, respectively, fragmentary plan and side elevational views of a concrete shape serving either as a longitudinal member technically called a "stretcher," or a transverse member technically called a "header;"

Fig. 3 represents a vertical section taken in the plane indicated by the line III—III, Fig. 2;

Figs. 4, 5 and 6 represent, respectively, plan, side elevational and end elevational views of a filler member;

Figs. 7, 8 and 9 represent, respectively, plan, side elevational, and end elevational views of a pillow block;

Figs. 10 and 11 represent, respectively, side and end views of a panel member;

Fig. 12 represents a side elevation of a stub header:

Fig. 13 represents a fragmentary front elevation of the assembly, showing an open front construction;

Figs. 14 and 15 represent vertical sections taken, respectively, in the planes indicated by the lines XIV—XIV and XV—XV, Fig. 13;

Fig. 17 represents a vertical section taken in the plane indicated by the line XVII—XVII, Fig. 16;

Fig. 18 represents a front elevation taken from the plane indicated by the line XVIII—XVIII, Figs. 16 and 17;

Figure 16:
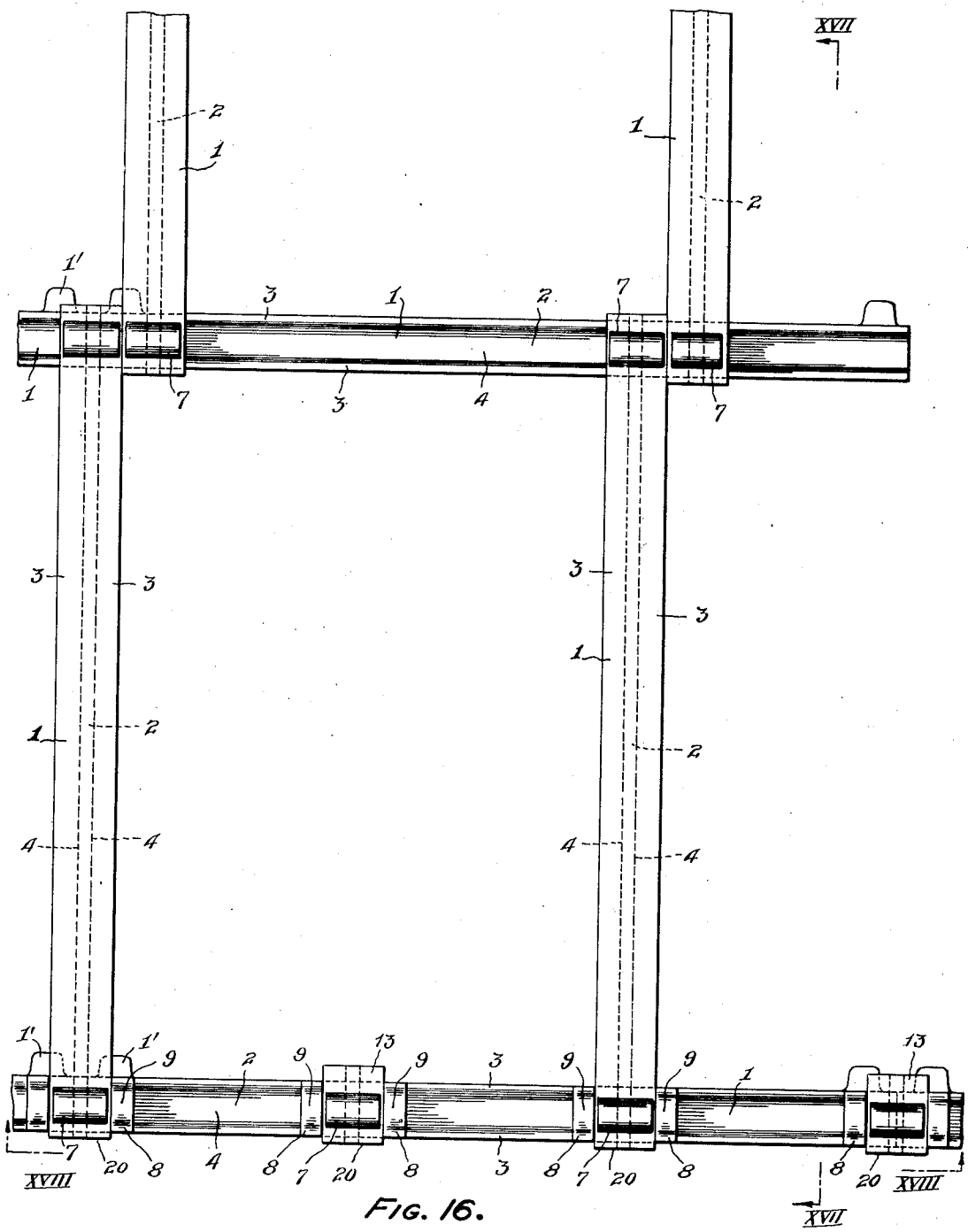
Fig. 16 represents a plan view taken from the plane indicated by the line XVI—XVI, Fig. 17, and showing one layer or tier only of the assembly.

Referring to the annexed drawings, and particularly to Figs. 1, 2 and 3, there is shown a main structure shape, adapted to serve either as a longitudinal member or a transverse member and termed, respectively, a "stretcher" or a "header," said shape comprising a body member 1 having a web 2 and side flanges 3, the same being in reality a shape of H-section. This section has the trough 4 upon both sides of the web 2. A channel section, also, is hereinafter described and shown in the accompanying drawings, but our flexible joint is applied to any section of concrete beam, whether I-section, H-section, channel section fully described herein, or a square or rectangular section, by casting grooves or spaced pockets in the top and bottom of the beam at each end and at regular intervals along the beam and corresponding lugs on one of the adjacent sides, thus making flexible joints, by using filler and filler blocks, protecting the wall from fracture due to the usual forces of creeping, settlement or expansion. To illustrate, a lateral surface of this H-section 1 is formed with spaced lugs 1' of substantially the same cross-section and shape as the trough 4, for a purpose hereinafter fully described. There is disposed upon the top of the H-section 1, when the same is utilized as a transverse member or header, a filler block 7, plainly shown in Figs. 4, 5 and 6, and also of substantially the same cross-section and shape as the trough 4. It will be noted, and the same is plainly apparent from an inspection of Fig. 14, that the shape 1, when used as a stretcher or longitudinal member, is so disposed that the H-section lies in the vertical; whereas, when the same is used as a header or transverse member, the shape is turned a quadrant in a vertical plane so that the H-section lies in the horizontal. Having disposed and suitably spaced the respective stretchers and headers, the header lugs 1' anchoring in the troughs 4 of the stretchers, the structure is reinforced, in so far as the front is concerned, by means of pillow blocks 8, plainly shown in Figs. 7, 8 and 9, the same being formed with end lugs 9 and 10, respectively, and a side lug 11, all of substantially the same contour and shape as the trough 4. The disposition of these pillow blocks 8 is plainly shown in Figs. 13, 14 and 15, and it will be noted that the end lugs 9 and 10 tie into troughs 4 of the adjacent upper and lower stretchers 1, respectively, and that the side lug 11 ties into a trough 4 of the adjacent header 1. A pair of these pillow blocks is utilized in connection with each joint, the same being disposed in reverse positions, as plainly shown in Fig. 13. For the purpose of lightening the weight, these pillow blocks 8 are provided in their rear faces with deep recesses 12, plainly shown in Figs. 8 and 9. The joints of the stretchers may be disposed in the vertical plane of the center of the headers and contiguous joints are not necessarily disposed in the same vertical plane but may be staggered in any desired manner, one relative arrangement of the same being plainly shown in Fig. 18. It has been stated that the various lugs described are substantially of the same contour and size as the troughs 4, the variation between the same being that amount necessary to permit sufficient bedding mortar 14 to be utilized, as plainly shown in Fig. 15.

We find that it is not necessary, in so far as the rigidity and strength of the structure is concerned, to extend all of the transverse members or headers throughout the depth of the structure, so that suitably spaced as desired we provide stub headers 13, plainly shown in Fig. 16, which serve the purpose of building up and completing the front columns of the structure. As plainly shown in Figs. 16 and 17, the extreme front ends 20 of the headers and stub headers are extended slightly forwardly of the general front vertical plane of the structure.

Figures 20, 21, 24:
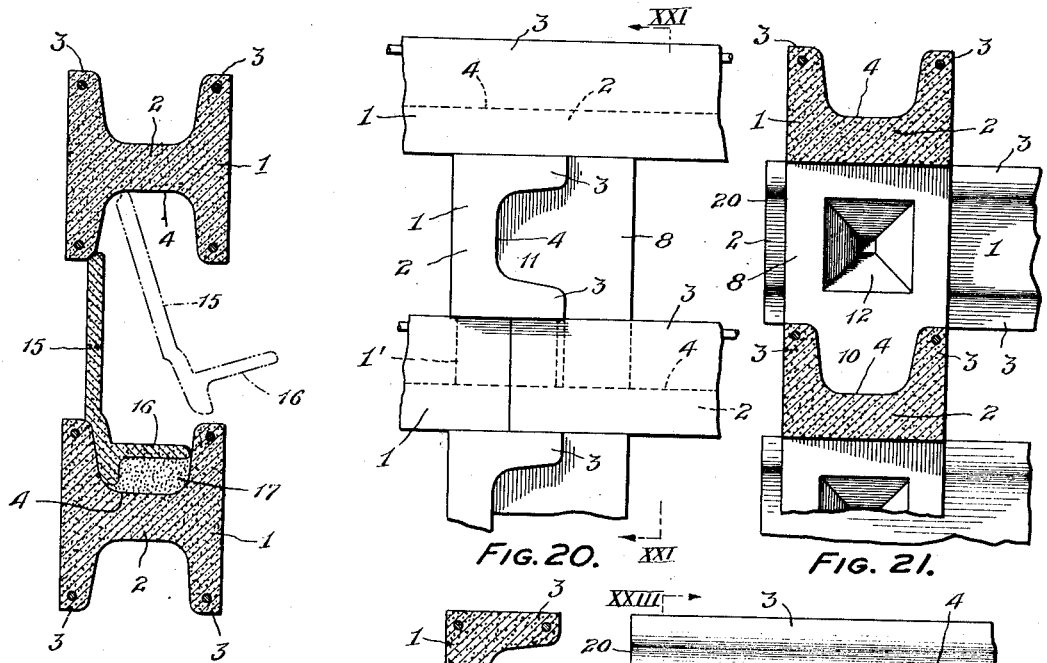
Fig. 20 represents a fragmentary elevation of a modified construction.
Fig. 21 represents a vertical section taken in the plane indicated by the line XXI—XXI, Fig. 20.
Fig. 24 represents a vertical section of a modification in which the panel member, illustrated in Figs. 10 and 11, is utilized.
Figures 22, 23:
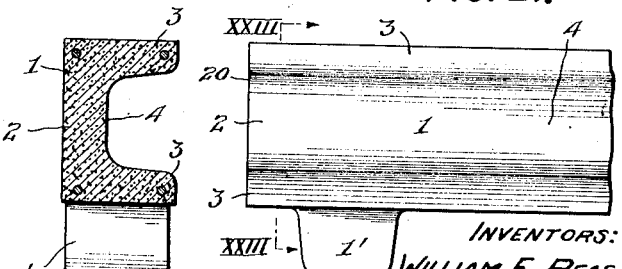
Fig. 22 represents a side elevation of the header of the modified construction shown in Fig. 20.
Fig. 23 represents a vertical section taken in the plane indicated by the line XXIII—XXIII, Fig. 22.

In order that the cribbing may present a solid front, we may utilize a panel member plainly shown in Figs. 10 and 11, having a vertical body portion 15 adapted to be fitted to the trough 4 of the upper stretcher and an extended side member 16 of about the length of the width of the trough 4 and adapted to be fitted to the trough of the lower stretcher. The method of placing said panel section, which closes the open front between contiguous pillow blocks 8, is plainly shown in Fig. 24, as is also suitable grouting 17 disposed in the trough 4 and under the extended end member 16 of the panel.

We also find it feasible to use, instead of the H-section heretofore described, other shapes and sections, and we have shown in the accompanying drawings a channel construction, plainly shown in Figs. 20 to 23 inclusive. The use of this member as a stretcher and header results in the use of only one pillow block in connection with each joint, as plainly shown in Fig. 20. It also results, when using standard size shapes, in a closer spacing of the stretcher members due to the use of only the bottom lug 10 of said pillow block, as plainly shown in Figs. 20 and 21. We find it feasible to vary within widely differing limits all the dimensions of the shapes.

Figure 19:
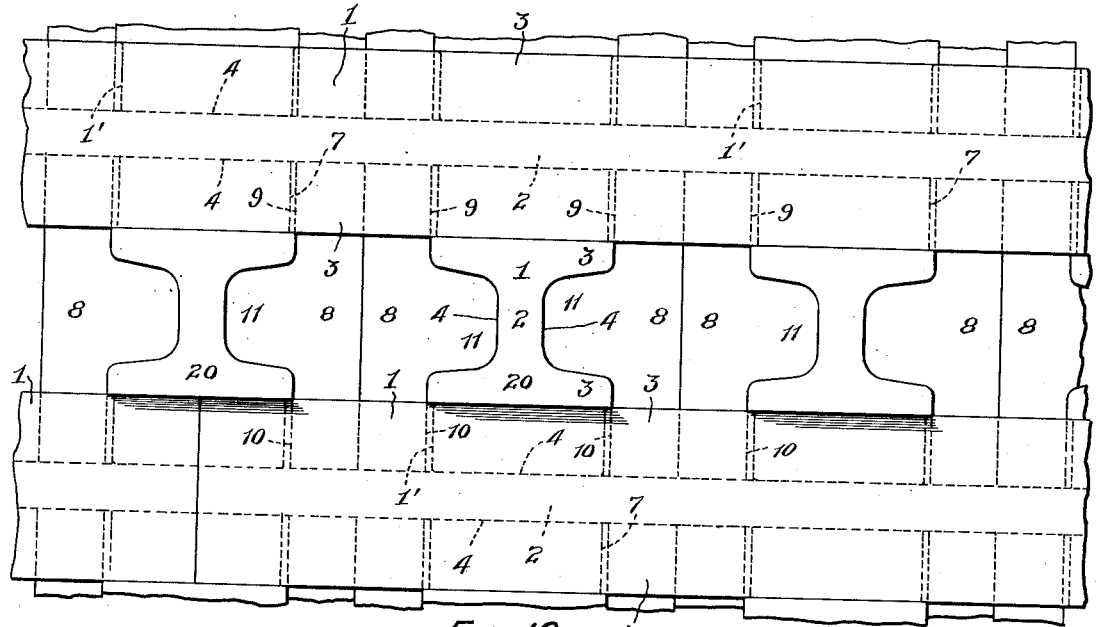
Fig. 19 represents a fragmentary front elevation of the assembly, showing a solid front construction.

Referring particularly to Figs. 13 and 19, it will be noted that constructions are shown in which the assembly forms an open front construction and a solid front construction, respectively.

What we claim is:

1. In a retaining wall, the combination of interlocking longitudinal stretchers and transverse headers, said stretchers and headers being similarly shaped but disposed in dissimilar positions in the wall; and pillow blocks interlocking with said stretchers and headers, forming flexible joints.

2. In a retaining wall, the combination of interlocking longitudinal stretchers and transverse headers, said stretchers and headers being similarly shaped but disposed in dissimilar positions in a vertical plane; and pillow blocks interlocking with said stretchers and headers, forming flexible joints.

3. In a retaining wall, the combination of a plurality of spaced longitudinal stretchers; a plurality of spaced transverse headers disposed therebetween, said stretchers and headers being formed with coöperating interlocking means; and pillow blocks formed with end lugs interlocking with the stretchers and side lugs interlocking with the headers, forming flexible joints.

4. In a retaining wall, the combination of interlocking longitudinal stretchers and transverse headers, said stretchers and headers having troughs and being similarly shaped but relatively arranged a quadrant apart in a vertical plane; and pillow blocks provided with end and side lugs interlocking with the troughs of said stretchers and headers, forming all flexible joints.

5. In a retaining wall, the combination of interlocking longitudinal stretchers and transverse headers, said stretchers and headers being shaped of H-cross-section but relatively arranged a quardant apart in a vertical plane; and pillow blocks provided with end lugs interlocking with the troughs of two adjacent stretchers and with a side lug interlocking with the trough of a header, forming all flexible joints.

6. In a retaining wall, the combination of longitudinal stretchers and transverse headers having troughs and relatively arranged a quadrant apart in a vertical plane and formed with spaced transverse side lugs, of which the header lugs interlock with the respective troughs of adjacent stretchers; and pillow blocks provided with end and side lugs interlocking with the troughs of said stretchers and headers.

7. In a retaining wall, the combination of longitudinal stretchers and transverse headers of H-cross-section relatively arranged a quardant apart in a vertical plane and formed with spaced transverse side lugs of which the header lugs interlock with the respective troughs of adjacent stretchers; pillow blocks, provided with end lugs interlocking with the troughs of two adjacent stretchers and with a side lug interlocking with the trough of a header; and filler blocks positioned upon the side of said headers opposite that upon which said lugs are formed and interlocking with the troughs of adjacent stretchers, respectively.

8. In a retaining wall, the combination of a plurality of spaced longitudinal stretchers, a plurality of spaced transverse headers disposed therebetween, said stretchers and headers being formed with coöperating interlocking means; pillow blocks formed with end lugs interlocking with the stretchers and side lugs interlocking with the headers; and panels retained between upper and lower stretchers and filling the open front between laterally adjacent headers.

9. In a retaining wall, the combination of a plurality of spaced longitudinal stretchers; a plurality of spaced transverse headers disposed therebetween, said stretchers and headers being formed with coöperating interlocking means; pillow blocks formed with end lugs interlocking with the stretchers and side lugs interlocking with the headers; and panels interlocking with the troughs of upper and lower stretchers and filling the open front between the contiguous pillow blocks of laterally adjacent headers.

10. In a retaining wall, the combination of interlocking longitudinal stretchers and transverse headers, said stretchers and headers being shaped of channel cross-section but relatively arranged a quadrant apart in a vertical plane; and a single pillow block for each interlocking joint of said stretchers and headers and formed with end and side lugs interlocking with the troughs of said channel section stretchers and headers.

11. In a retaining wall, the combination of a plurality of spaced longitudinal stretchers having troughs; a plurality of spaced transverse headers having troughs and disposed therebetween; stub headers having troughs and disposed between said headers and between stretchers which are contiguous in a vertical plane, said headers and stub headers being formed with lugs interlocking with the troughs of adjacent stretchers; pillow blocks provided with an end lug interlocking with the trough of an adjacent stretcher and with a side lug interlocking with the trough of a header or stub header; and filler blocks positioned upon the side of said headers and stub headers opposite that upon which their lugs are formed and interlocking with the troughs of adjacent stretchers, respectively, making all joints free to move in vertical and horizontal planes.

12. In a retaining wall the combination of a channeled header and stretcher, the said header having a projection thereon fitting in a channel of the said stretcher, and a pillow block at the crossing point of the said header and stretcher.

13. A concrete H beam having on one face thereof a projecting lug adapted to interlock betwen the flanges of an adjacent beam when the beams are assembled in crossed relation, as in a cribbing.

14. A cribbing comprising courses of crossed channeled beams, pillow blocks beside the beams of one course and between the beams of the adjacent courses, at the crossing points, and filler blocks in the channels of the beams at the points of crossing.

15. A retaining structure comprising courses of crossed stretcher and header concrete H beams, the beams of the header courses having projections interlocking between flanges of the stretcher beams, and pillow blocks at the crossings of the beams, set between the stretcher beams and beside the header beams.

16. A retaining structure comprising courses of crossed stretcher and header concrete H beams, the beams of the header courses having projections interlocking between the flanges of the stretcher beams, and pillow blocks at the crossings of the beams, set between the stretcher beams and beside the header beams, said pillow blocks having lugs interlocking with the flanges of the adjacent beams.

17. Cribbing comprising courses of crossed concrete H beams, the beams of one course having lugs interlocking between the flanges of the beams of the next course, pillow blocks beside the beams of one course and between the beams above and below the same, said blocks having lugs engaging between the flanges of the adjacent beams, and filler blocks between the flanges of the beams of one set of courses, at the crossings of said beams with the beams of the other set.

Signed by us, this 2nd day of June, 1919.

WILLIAM E. PEASE.
NOAH H. SULOFF.